United States Patent

Suzuki et al.

[11] Patent Number: 4,835,696
[45] Date of Patent: May 30, 1989

[54] SYSTEM AND METHOD FOR AUTOMATICALLY CONTROLLING A VEHICLE SPEED TO A DESIRED CRUISING SPEED

[75] Inventors: Kouichi Suzuki, Fuchu; Kiyoshi Konishi, Zushi; Toshio Iwaoka, Yokohama; Yuuichi Yamaguchi, Kamakura; Eisaku Hori, Yokohama; Satoru Sekiguchi, Kawasaki, all of Japan

[73] Assignees: Nissan Motor Company, Ltd.; Jidosha Denki Kogyo Kabushiki Kaisha, both of Yokohama, Japan

[21] Appl. No.: 55,516

[22] Filed: May 29, 1987

[30] Foreign Application Priority Data

Aug. 28, 1986 [JP] Japan ................................ 61-200071

[51] Int. Cl.$^4$ ............................................. B60K 31/00
[52] U.S. Cl. ................................. 364/426.04; 180/179; 123/352
[58] Field of Search ..................... 364/426.04, 431.07; 180/176, 179, 170; 123/352

[56] References Cited

U.S. PATENT DOCUMENTS 4,553,621 11/1985 Hyodo et al. ........................ 123/352
4,591,986 5/1986 Nakajima et al. ............... 364/431.07
4,598,370 7/1986 Nakajima et al. ............... 364/431.07
4,650,020 3/1987 Mizuno et al. ....................... 364/426
4,723,213 2/1988 Kawata et al. ....................... 180/179
4,725,969 2/1988 Onogi et al. ......................... 180/179

FOREIGN PATENT DOCUMENTS 60-163735 8/1985 Japan .

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruising speed in which a transfer point at which control of the vehicle speed is transferred from that carried out by returning the vehicle speed to the cruising speed set through an operation of a set switch at a controllable acceleration in the vehicle speed to that carried out by controlling the vehicle speed so that the vehicle speed coincides with the set cruising speed is determined on the basis of a sum of an acceleration value multiplied by a constant and speed difference from the actual vehicle speed to set cruising speed. Consequently, an overshooting of the vehicle speed does not occur when the vehicle speed is returned toward and finally settles at the set cruising speed.

17 Claims, 9 Drawing Sheets

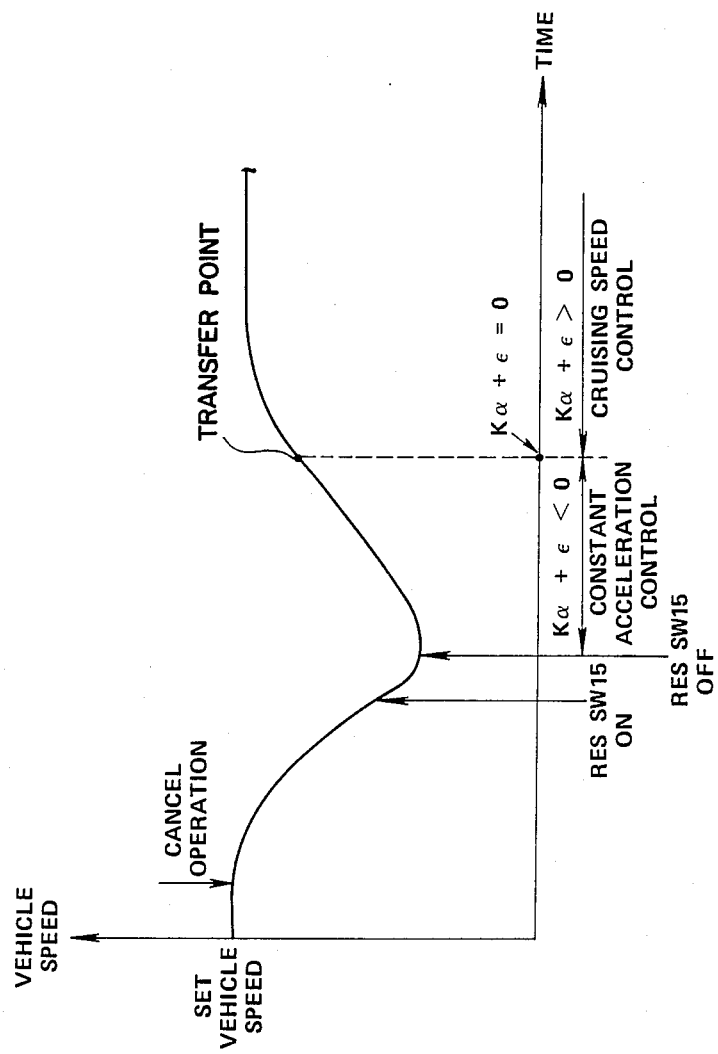

SYSTEM AND METHOD FOR AUTOMATICALLY CONTROLLING A VEHICLE SPEED TO A DESIRED CRUISING SPEED

BACKGROUND OF THE INVENTION

The present invention relates to a system and method for automatically controlling a vehicle speed to a desired cruising speed.

A kind of system for automatically controlling vehicle speed to the desired cruising speed is exemplified by a Japanese Patent Application First publication (Tokkai) No. Sho 60-163735 published on Aug. 26, 1985.

In the above-identified Japanese Patent Application document, the automatic vehicle speed controlling system includes a command switch group used for controlling the vehicle speed to the desired cruising speed and a vehicle speed sensor. The command switch group includes a set switch for operatively commanding the cruising speed control, an acceleration switch, and a resume switch (reset switch). In addition, the automatic vehicle speed controlling system includes an actuator for actuating a throttle valve in the vehicle's engine to open or close at an angular position thereof in response to an input signal. The actuator includes a vent valve, a safety valve, and a vacuum valve. When the vacuum valve is opened and simultaneously the vent valve is closed, a negative pressure is introduced into a pressure chamber of the vacuum valve so that the throttle valve is actuated to displace toward an open direction. When the vent valve is opened and simultaneously the vacuum valve is opened, atmospheric pressure is introduced into the pressure chamber so that the throttle valve is actuated to displace toward a close direction.

Furthermore, a brake switch and a clutch switch are also installed to detect a depression of the brake pedal and to detect a depression of the clutch pedal, respectively.

When the vehicle driver depresses the brake pedal or depresses the clutch pedal during automatic cruising speed control by the automatic vehicle speed controlling system, the adjustment of the throttle valve by means of the actuator is released. At this time, the vehicle speed deviates from a set vehicle speed in response to the off operation of the set switch and the set vehicle speed is stored in a storage unit of the automatic vehicle speed controlling system. In this state, when the reset switch is once closed (ON) and again opened (OFF), the vehicle speed is returned to the set vehicle speed without operation of the set switch.

When a vehicle speed difference between the set vehicle speed and the actual vehicle speed exceeds a predetermined value during the return of the vehicle speed to the set vehicle speed, a constant acceleration control for the vehicle is carried out such that the opening angle of the throttle valve is adjusted so that the rate of increase in the vehicle speed coincides with a predetermined rate. When the vehicle speed difference becomes reduced and below the predetermined value, the automatic cruising speed control system enters the cruising speed control.

In the conventional vehicle speed controlling system disclosed in the above-identified Japanese Patent Application document, since a transfer point at which the vehicle speed control is transferred from the constant acceleration control to the automatic cruising speed control is set when the difference between the actual vehicle speed and the set vehicle speed drops below the predetermined value, the predetermined value needs to be adjusted according to models of vehicles on which the automatic vehicle speed controlling systems is mounted. This is because engine output characteristics and so on are vary according to the model of the vehicle. If the predetermined value is not changed according to the model of the vehicle, an overshooting of the vehicle speed occurs and a long time occurs before the vehicle speed settles at the set vehicle speed. Therefore, since the transfer point needs to be adjusted for each of the models of vehicles on which the above-described system is mounted, so that the adjustment operation becomes troublesome and costly.

SUMMARY OF THE INVENTION

It is an object of the present invention to provide a system and method for automatically controlling vehicle speed to a desired cruising speed which eliminates adjustment of the control transfer point for each vehicle model.

The above-described object can be achieved by providing system for controlling a running speed of an object, comprising: (a) first means for adjusting the running speed of the object according to a displacement position thereof; (b) second means for operatively generating and outputting a set command to set the running speed to a cruising speed; (c) third means for detecting the actual running speed; (d) fourth means for generating and outputting a first signal to the first means in response to the set command from the second means so that the actual running speed detected by the third means is controlled so as to coincide with the set cruising speed; (e) fifth means for detecting a state in which the running speed is forcibly reduced and the control of the running speed is interrupted by means of the fourth means; (f) sixth means for operatively generating and outputting a reset command to return the actual running speed to the set cruising speed after said state is detected by the fifth means; (g) seventh means for generating and outputting a second signal to the first means in response to the reset command from the sixth means so that the actual running speed detected by the third means is controlled so as to return the vehicle to the set cruising speed; (h) eighth means for determining a transfer point at which the vehicle speed control is transferred from the seventh means to the fourth means on the basis of a speed difference between the actual running speed and the set cruising speed and a value corresponding to a rate of change in the running speed during the return of the vehicle speed to the set cruising speed by the seventh means; and (i) ninth means for transferring the running speed control from the seventh means to the fourth means when the transfer point determined by the eighth means is reached.

The above-described object can also be achieved by providing a system for controlling a vehicle speed, comprising: (a) first means for actuating a throttle valve of a vehicle's engine to displace an angular position of the throttle valve so as to adjust the vehicle speed in response to a signal inputted thereto; (b) second means for detecting an actual vehicle speed; (c) a set switch for operatively generating a cruising speed command signal; (d) third means for storing the vehicle speed detected by the second means in response to the cruising speed command signal from the set switch; (e) fourth means for generating and outputting a control signal to the first means so that the vehicle runs at the stored vehicle speed; (f) fifth means for operatively releasing the vehicle speed control by the fourth means; (g) a reset switch for operatively generating and outputting a return command signal after the vehicle speed control by the fourth means is released by the fifth means; (h) sixth means for calculating a sum of a speed difference between the stored vehicle speed and the actual vehicle speed, and an acceleration value during the return of the vehicle speed, to the stored vehicle speed multiplied by a constant, and determining whether the sum indicates is positive or negative in response to the return command signal from the reset switch; and (i) seventh means for transferring the vehicle speed control to the fourth means when the sixth means determines that the calculated sum is positive.

The above-described object can also be achieved by providing a method for controlling a vehicle speed, comprising the steps of: (a) generating and outputting a set command to set the vehicle speed to a cruising speed; (b) detecting the actual vehicle speed; (c) generating and outputting a first control signal to a first means for adjusting the vehicle speed according to an angular position thereof in response to the set command signal outputted in the step (a) above so that the actual vehicle speed detected in the step (b) above is controlled so as to coincide with the set cruising speed; (d) detecting a state in which the vehicle speed is forcibly reduced and when the control of vehicle speed carried out in the step (c) above is interrupted; (e) generating and outputting a reset command to return the actual vehicle speed to the set cruising speed after the detection in the step (d) above; (f) generating and outputting a second signal to the first means in response to the reset command outputted in the step (e) so that the actual vehicle speed is controlled so as to return to the set cruising speed; (h) determining a transfer point at which the vehicle speed control is transferred to the control carried out in the step (c) above on the basis of a speed difference between the actual vehicle speed detected in the step (b) above and the set cruising speed set in the step (a) above and a value corresponding to a rate of change in the present vehicle speed; and (i) transferring the vehicle speed control from the control carried in the step (e) above to the control carried out in the step (c) above when the transfer point determined in the step (b) above is reached.

BRIEF DESCRIPTION OF THE DRAWINGS

FIG. 4 is an illustration for explaining the operation of the automatic vehicle speed controlling system in the first preferred enbodiment.

DETAILED DESCRIPTION OF THE PREFERRED EMBODIMENTS

Reference will hereinafter be made to the drawings in order to facilitate understanding of the present invention.

Figure 1:
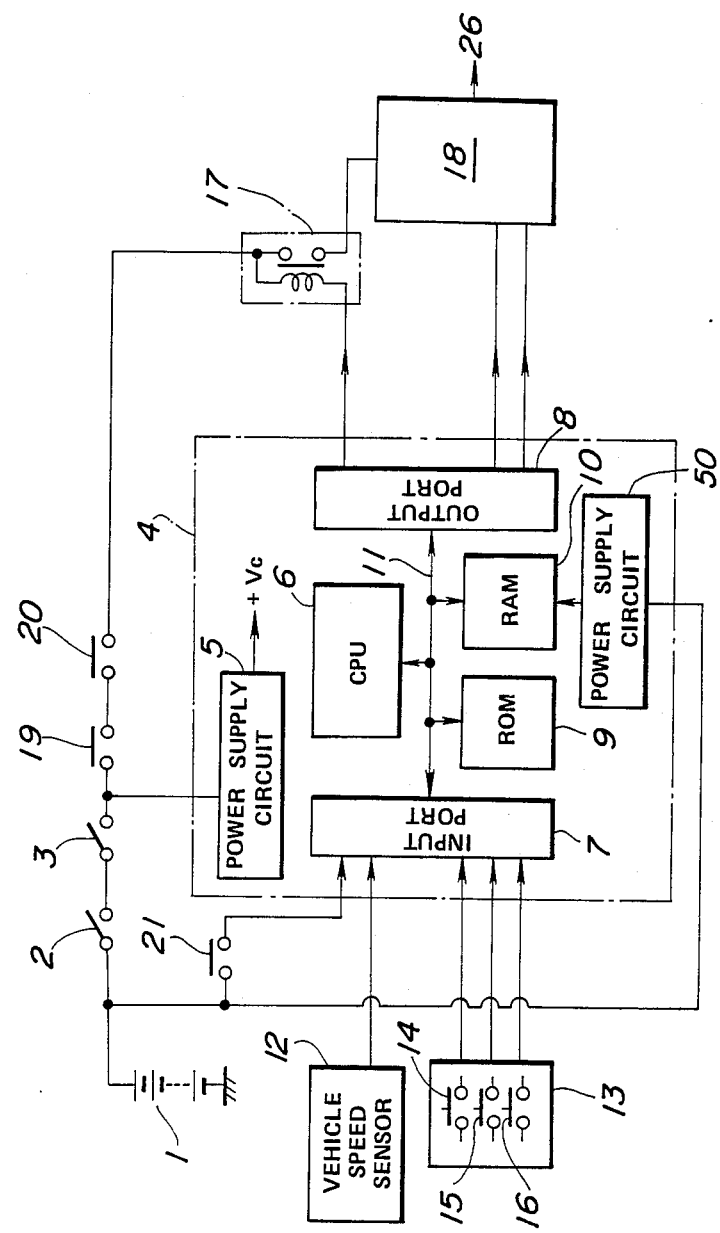
FIG. 1 is a circuit block diagram of a system for automatically controlling vehicle speed to a desired cruising speed in a first preferred embodiment according to the present invention.

FIG. 1 shows a circuit block diagram of the system for automatically controlling vehicle speed to the desired cruising speed in a first preferred embodiment according to the present invention.

In FIG. 1, a vehicle battery 1 is connected to a power supply circuit 5 via an ignition switch 2 and a main switch 3. The power supply circuit 5 in a controller 4 receives a battery voltage from the battery 1 via the ignition switch 2 and the main switch 3 and produces a constant power supply voltage required for the operation of the controller 4. The controller 4 comprises a CPU 6 (Central Processing Unit), an Input Port 7, an Output Port 8, a ROM 9 (Read Only Memory) for fixedly storing a control program to be described later, and a RAM 10 (Random Access Memory) for temporarily storing data on an operation quantity for displacing the throttle valve at an angular position. These circuit elements are interconnected via a bus line 11. It is noted that the RAM 10 receives power from another power supply circuit 50 directly connected to the vehicle battery 1 to prevent erasure of the storage contents of the RAM 10 when the ignition switch 2 is turned off.

The Input Port 7 in the controller 4 is connected to a vehicle speed sensor 12 and a command switch group 13 used for a cruising speed control to be described later. The command switch group 13 includes a set switch 14 for operatively commanding the cruising speed control, an acceleration switch 15, and a resume switch (reset switch) 16 to be described later.

The Port 8 of the controller 4 is connected to a relay circuit 17 and an actuator 18. When an electrical signal from the Output Port 8 is supplied to a relay coil of the relay circuit 17, a relay contact thereof is closed so that power is supplied to the actuator 18.

The actuator 18, for example, includes a vent valve 18a, a safety valve 18b, and a vacuum valve 18c. The actuator 18 carries out the control of an angular position of a throttle valve 26 to adjust the air flow rate of an air intake passage of the engine so as to control the vehicle speed.

Figure 2:
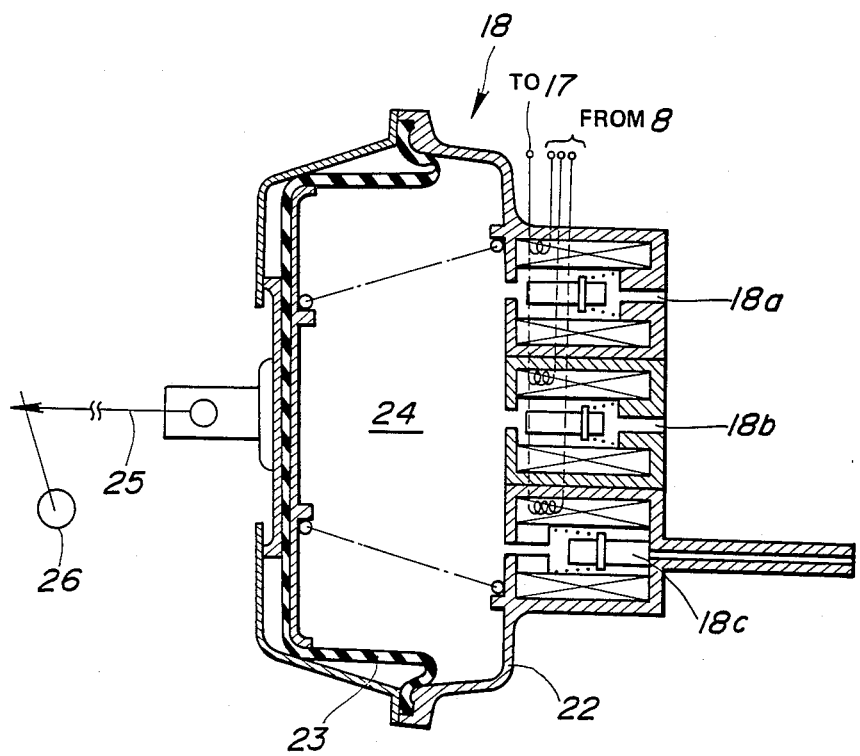
FIG. 2 is a longitudinally sectioned view of an example of an actuator shown in FIG. 1.

An example of the actuator 18 is shown in FIG. 2.

When the vacuum valve 18c is opened and simultaneously the vent valve 18a is closed, a negative pressure derived from, e.g., an intake manifold of the engine, is introduced into a pressure chamber 24 via the vacuum valve 18c, and the throttle valve 26 is actuated to displace toward the open direction thereof. On the contrary, when the vent valve 18a is opened and simultaneously the vacuum valve 18c is closed, atmospheric pressure is introduced into the pressure chamber 24 so that the throttle valve 26 is actuated to displace toward the close position thereof. In FIG. 2, numeral 23 denotes a diaphragm, numeral 22 denotes a casing of the actuator 18, and numeral 25 denotes a wire member connected between the throttle valve 26 and the diaphragm 23.

Furthermore, a brake switch 19 which is opened when a brake pedal of the vehicle is depressed and a clutch switch 20 which is opened when a clutch pedal of the vehicle is depressed (to disengage an input shaft of the transmission gear from the engine output), are disposed in the power supply line between the main switch 3 and the relay circuit 17. When the brake pedal of the clutch is depressed during the cruising speed control, the power supply to the relay circuit 17 is interrupted so that the control over the angular position of the throttle valve by means of the actuator 18 is released.

Furthermore, a set signal produced by a stop lamp switch 21, which is lighted when the brake is operated, is transmitted to the Input Port 7 of the controller 4, the set signal serving as a release signal of the cruising speed control for the controller 4.

Figure 3:
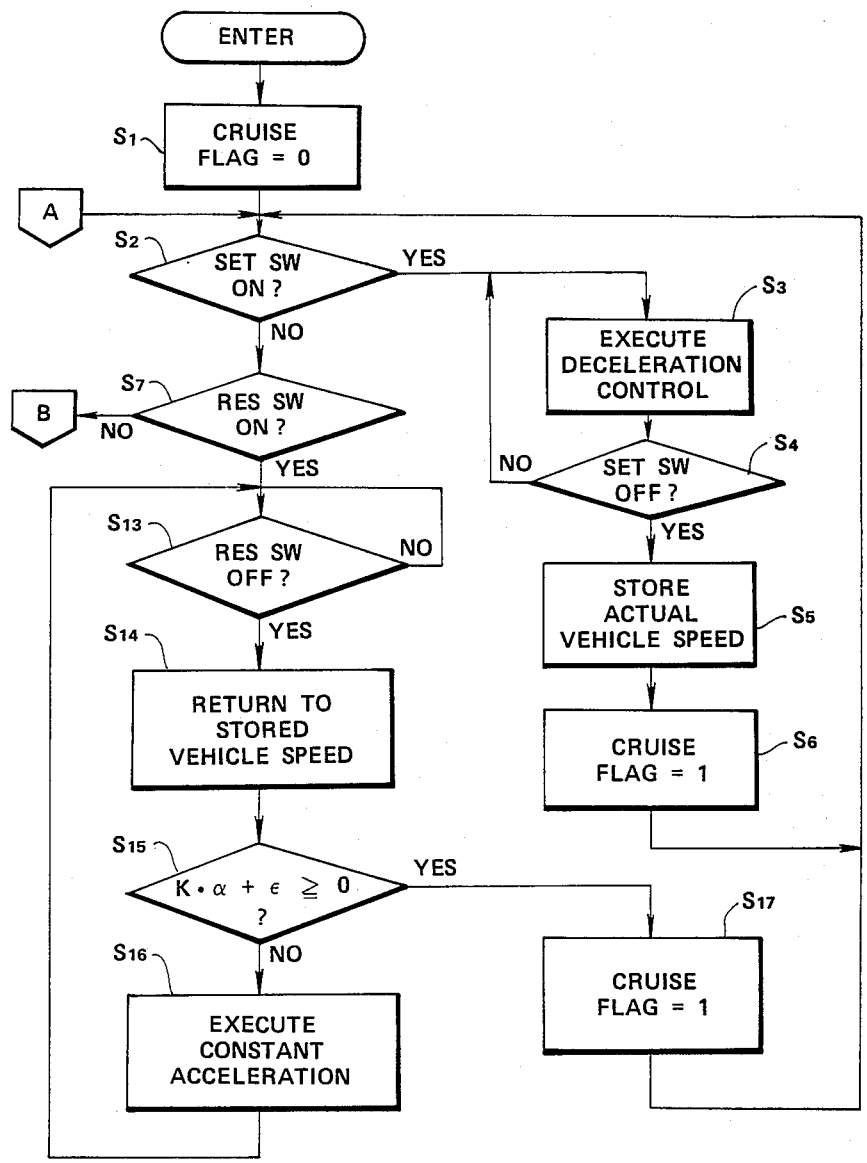
FIGS. 3(A) and 3(B) are integrally a flowchart of a control program executed by the automatic vehicle speed controlling system in the first preferred embodiment according to the present invention.
Figure 3B:
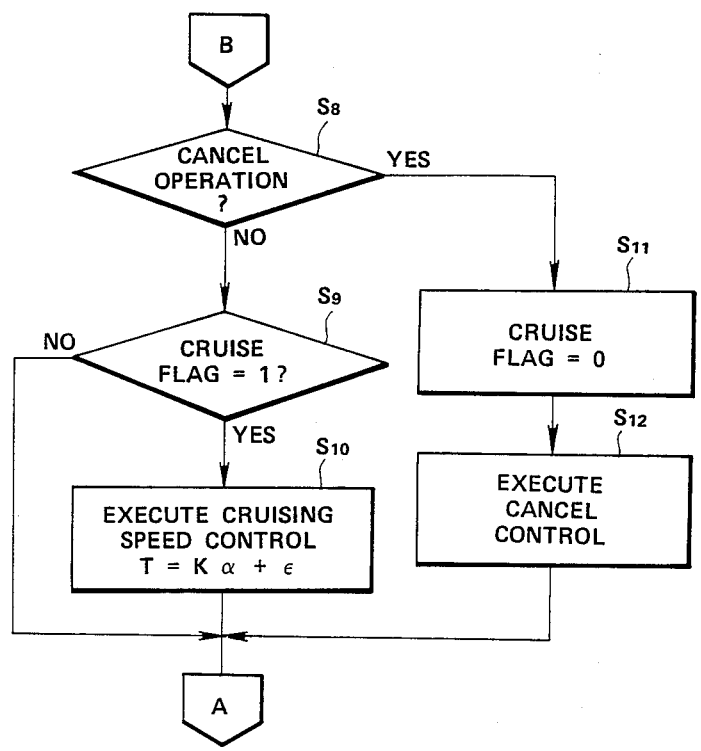

Next, an operation of the automatic vehicle speed controlling system in the first preferred embodiment will be described below with reference to FIGS. 3(A) and 3(B).

First, in a step $S_1$ a cruise flag is set to 0. The cruise flag indicates whether cruising speed control is carried out. In a step $S_2$, the controller 4 determines whether the set switch 14 in the command switch group 13 is turned to ON. If the set switch 14 is turned to ON in the step $S_2$, the routine goes to a step $S_3$ in which the vehicle speed is executed under a control of deceleration. The driver adjusts the actual vehicle speed to a set vehicle speed at which the vehicle driver desires the vehicle to run, during the execution of the step $S_3$. In steps $S_4$ and $S_5$, the actual vehicle speed is stored at a time when the set switch 14 is operated in the OFF state. In the next step $S_6$, the cruise flag is set to 1. Thereafter, the routine returns to the step $S_2$. Next, the routine goes to a step $S_9$ passing through the steps $S_7$ and $S_8$. In the step $S_9$, the system determines whether the cruise flag is set to 1. At this time, since the cruise flag is set to 1 as described above, the routine goes to a step 10 in which the actual vehicle speed is controlled so as to approach the set vehicle speed. That is to say, a control output quantity T for the actuator 18 is set to equation $T = K\alpha + \epsilon$. It is noted that K denotes a constant, $\alpha$ denotes a value of an acceleration, and $\epsilon$ denotes a vehicle speed difference between the actual vehicle speed the set cruising speed.

In a step $S_8$, the controller 4 determines if a cancel operation is carried out, e.g., if during the cruising speed running of the vehicle, either the brake pedal is depressed or the clutch is disengaged. If YES occurs in the step $S_8$, the cruise flag is set to 0 in a step $S_{11}$. In a step $S_{12}$, a cancel control operation for the cruising speed control is carried out. Therefore, the actual vehicle speed is deviates from the set vehicle speed as shown in FIG. 4. In this state, if the reset switch 16 is turned to ON in the step $S_7$ and the reset switch 16 is turned to OFF in a step $S_{13}$, the vehicle speed is changed to return to the above-described stored vehicle speed (set vehicle speed) without reoperation of the set switch 14. During the resume operation to return to the cruising speed control, the controller 4 determines if $K \cdot \alpha + \epsilon \geq 0$ in a step $S_{15}$. If $K \cdot \alpha + \epsilon < 0$, the routine goes to step $S_{16}$ in which the controller 4 executes an acceleration control such that the controller 4 continues to output a speed increase signal at a constant rate (a constant acceleration value, preferably, $\alpha$ in the step $S_{10}$) to the actuator 18 until $k \cdot \alpha + \epsilon \geq 0$. Such an acceleration control as described above is exemplified by a U.S. patent application Ser. No. 043,468 having a priority based on a Japanese Patent Application file No. Sho 61-102441 filed on May 1, 1986 and titled "A System and Method for Automatically Controlling a Vehicle Speed to a Desired Cruising Speed." The contents of the above-identified U.S. Patent Application is hereby incorporated by reference.

If $K \cdot \alpha + \epsilon \geq 0$ in the step $S_{15}$, the routine goes to a step $S_{17}$ in which the cruise flag is set to 1. Thereafter, the routine goes to the step $S_{10}$ in which the controller 4 outputs a speed decrease signal to the actuator 18 so that the vehicle speed smoothly approaches the set vehicle speed as shown in FIG. 4.

Figure 5:
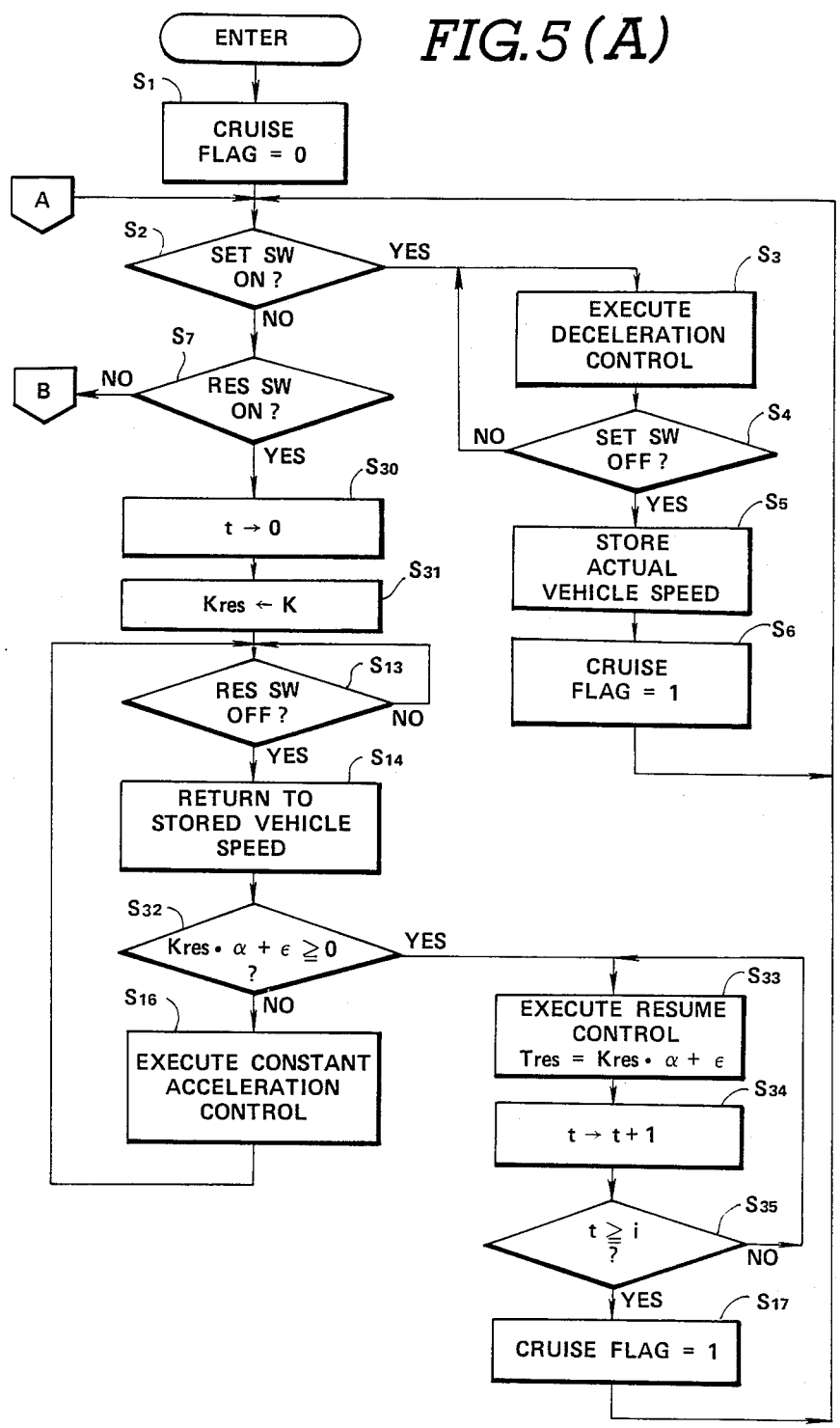
FIGS. 5(A) and 5(B) are integrally a flowchart of a control program executed by the system in a second preferred embodiment according to the present invention.

As described above, a transfer point at which the vehicle speed control is transferred from the constant acceleration control to the crusing speed control is set according to the sign ($\geq 0$ or $<0$) of ($K \cdot \alpha + \epsilon$) in the step $S_{15}$. FIG. 4 and FIG. 5(A), step $S_{32}$, illustrate this transfer point. Hence, since the present acceleration value $\alpha$ multiplied by the constant, denoted by $K\alpha$, is added to the present vehicle speed difference $\epsilon$, the automatic vehicle speed controlling system in the first preferred embodiment can be applied to a plurality of vehicle models having mutually different engine output characteristics. Consequently, no adjustment operation for the transfer point is required for each vehicle model. In this way, the same software program is applicable to each vehicle model so that the ease and efficiency in assembling the automatic vehicle speed controlling system into each vehicle on which the system is to be mounted can be improved and the manufacturing cost can accordingly be reduced.

Figure 5B:
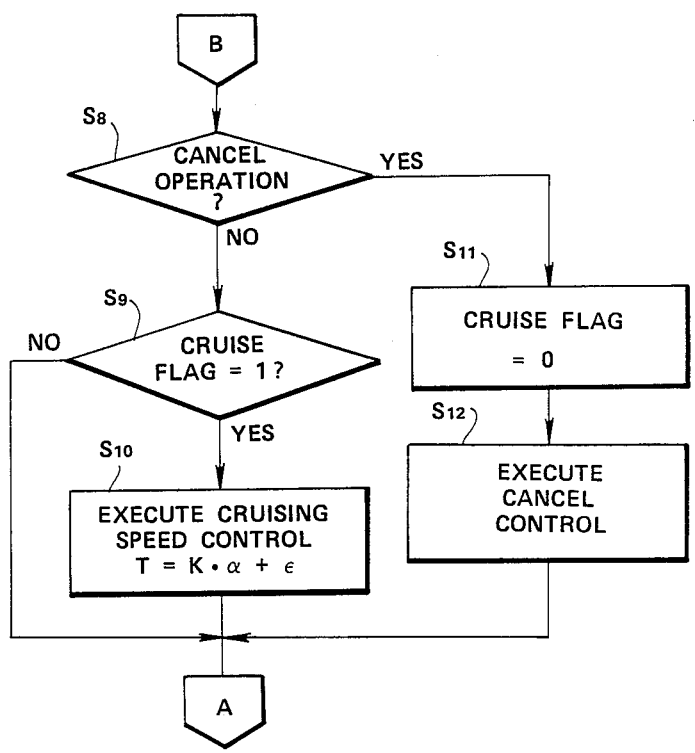

Next, a second preferred embodiment of the system for automatically controlling the vehicle speed to the desired cruising speed will be described with reference to a program flowchart integrally shown in FIGS. 5(A) and 5(B).

In the second preferred embodiment, the vehicle speed control is returned from the constant acceleration control to the normal cruising speed control after a predetermined time has elapsed after the start of the set vehicle speed returning (resume) operation.

The contents of steps $S_{30}$ to $S_{35}$ will be described below. The description on the other steps shown in FIGS. 5(A) and 5(B) will be omitted here since they are substantially the same as those shown in FIGS. 3(A) and 3(B).

In the step $S_{31}$, the acceleration constant K used in the first preferred embodiment is set to another acceleration constant Kres(Kres←K). It is noted that the acceleration constant Kres is smaller than the constant K described in the first preferred embodiment. In the step $S_{32}$, the system determines whether $Kres \cdot \alpha + \epsilon$ is equal to or greater than zero. If $Kres \cdot \alpha + \epsilon \geq 0$, the routine goes to a step $S_{33}$ in which the vehicle speed control is transferred to the resume control in which the vehicle speed is controlled with a new control output quantity to return to the set vehicle speed. That is to say, the control output quantity Tres for the actuator 18 is set as expressed by $Tres = Kres \cdot \alpha + \epsilon$. In the step $S_{30}$, a timer value t is set to zero(+/0). In the step $S_{34}$, the timer value t is incremented by one (t→t+1). The above-described resume control is continued until the timer value t reaches i in the step $S_{35}$. If $t \geq i$ in the step $S_{35}$, the control is returned to the normal cruising speed control $(T = KK\alpha +:)$.

In the second preferred embodiment, the acceleration constant Kres is set smaller than the acceleration constant K of the normal cruising speed control and the transfer point from the constant acceleration control to the cruising speed control can be brought nearer the stored vehicle speed. Therefore, the time taken for the vehicle speed to settle at the stored vehicle speed can be reduced. The other constructions and operations are the same as those in the first preferred embodiment.

Figure 6A:
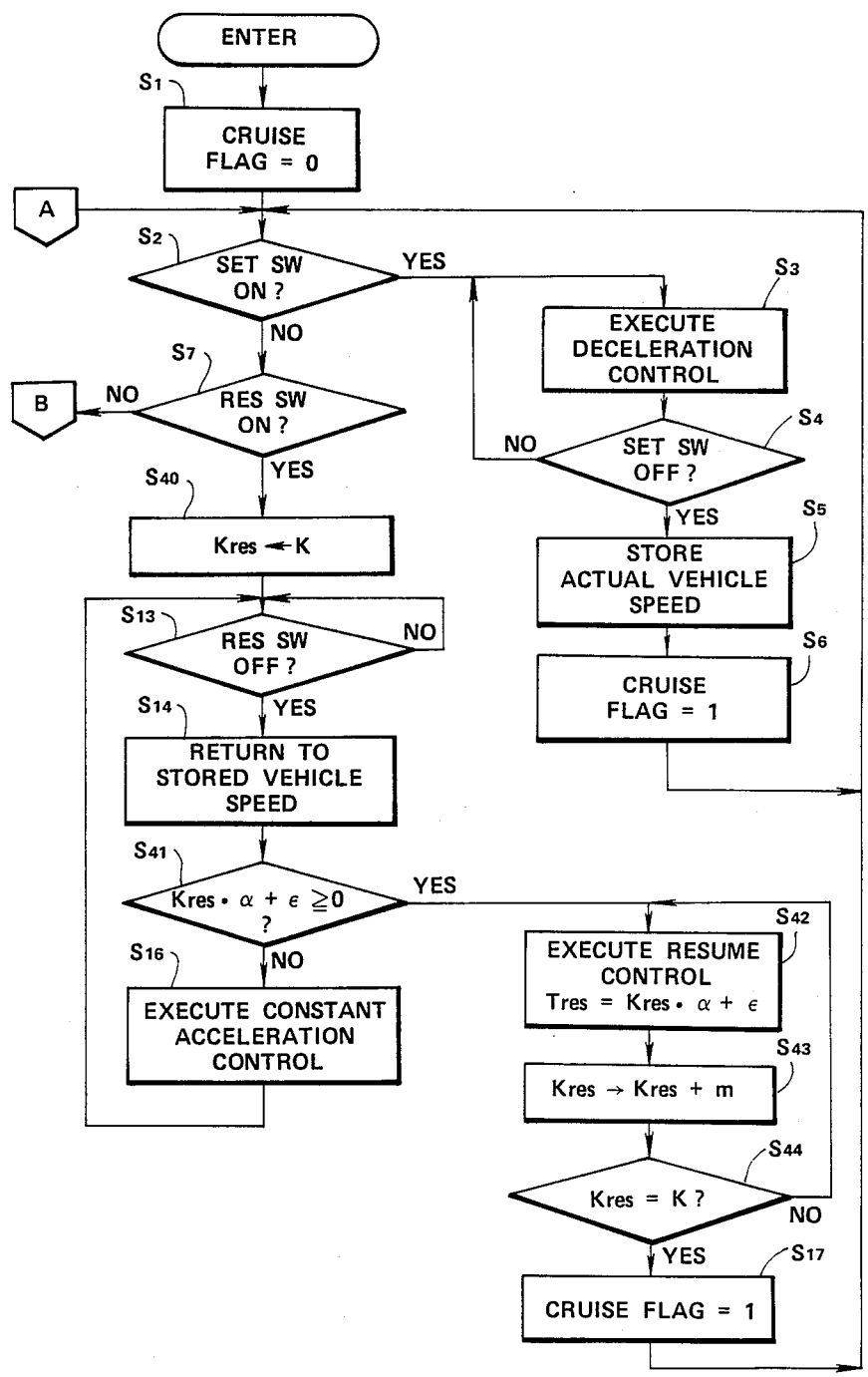
FIGS. 6(A) and 6(B) are integrally a flowchart of a control program executed by the system in a third preferred embodiment according to the present invention.
Figure 6B:
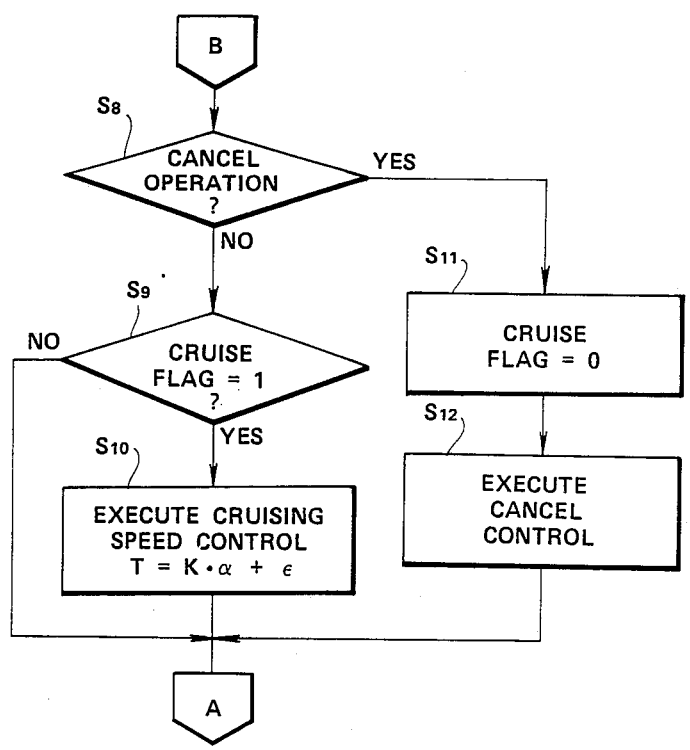

FIGS. 6(A) and 6(B) integrally show a third preferred embodiment of the system for automatically controlling the vehicle speed to the desired cruising speed according to the present invention.

In the third preferred embodiment, the acceleration constant Kres used in the second embodiment is varied. In addition, when the acceleration constant Kres reaches the predetermined constant K, the vehicle speed control is returned to the normal cruising speed control.

The contents of steps $S_{40}$ to $S_{44}$ will be described below and the description of the other steps will be omitted since the other steps are substantially same as those shown in FIGS. 3(A) and 3(B).

In a step $S_{40}$, the acceleration constant K is set to Kres. If ($Tres = KresKa+·$) in the step $S_{41}$, the routine goes to the step $S_{42}$ in which the control is transferred to the resume control ($Tres = Kres·\alpha + \epsilon$). Next, a predetermined value m is added to the previous acceleration constant Kres in the step $S_{43}$ (Kres=Kres+m). In the step $S_{44}$, the resume control is continued until the acceleration constant Kres becomes equal to the above-described acceleration constant K used in the normal cruising speed control. When Kres=K, the vehicle speed control is returned to the normal cruising speed control. In the third preferred embodiment, the time taken for the vehicle speed to settle at the stored vehicle speed is reduced. It is noted that the other constructions and operations are the same as those in the first and second preferred embodiments.

As described hereinabove, since in the system and method for automatically controlling vehicle speed to the desired cruising speed, the transfer point at which the control is transferred from the constant acceleration control to the cruising speed control is determined according to the sign of the sum of the acceleration value multiplied by the constant, and vehicle speed difference, the same control programs can be applied to different vehicle models having the different engine output characteristics. Therefore, no adjustment operation of the transfer point is required for each model. Consequently, the ease and efficiency in assembling the system into each vehicle of different models can be remarkably improved and a cost reduction of assembly can be achieved.

It will fully be appreciated by those skilled in the art that the foregoing description is made in terms of the preferred embodiments and that various changes and modifications may be made without departing from the scope of the present invention which is to be defined by the appended claims.

What is claimed is:

1. A system for automatically controlling a vehicle speed to a desired cruise speed, comprising:
   (a) first means, including a vehicular engine driving force adjusting mechanism, for adjusting the engine driving force so as to adjust the vehicle speed in response to an input signal thereof;
   (b) second means for operatively generating and outputting a set command to set a current vehicle speed as the desired cruise speed at which a vehicle is desired to cruise;
   (c) third means for detecting a current vehicle speed;
   (d) fourth means for generating and outputting a first signal to the first means in response to the set command from the second means so that the current vehicle speed detected by the third means is controlled through the first means in an auto-cruise control mode to coincide with the set cruise speed set by the second means;
   (e) fifth means for detecting a state in which the current vehicle speed is forcibly reduced and the control of the vehicle speed in the auto-cruise mode by fourth means is interrupted;
   (f) sixth means for operatively generating and outputting a reset command to return the current vehicle speed to the set cruise speed after the state is detected by the fifth means;
   (g) seventh means for generating and outputting a second signal to the first means in response to the reset command from the sixth means so that the current speed detected by the third means is controlled through the first means in a constant acceleration control mode to return to the original set cruise speed;
   (h) eighth means for determining whether a condition is satisfied such that the automatic cruise control carried out in accordance with the constant acceleration mode by the seventh means reaches a transfer point at which the automatic cruise control by the seventh means, in accordance with the constant acceleration mode, is transferred to the automatic cruise control by the fourth means in accordance with the auto-cruise mode, on the basis of a speed difference between the current vehicle speed and the set cruise speed and a value corresponding to a rate of change in the vehicle speed during the return of the vehicle speed to the set cruise speed in the constant acceleration mode by the seventh means; and
   (i) ninth means for transferring the automatic cruise control from control by the seventh means to control by the fourth means when the eighth means determines that said condition is satisfied.

2. The system according to claim 1, wherein the eighth means comprises:
   (a) tenth means for calculating a sum ($K·\alpha + \epsilon$) of the speed difference ($\epsilon$), and the rate of change ($\alpha$) of the running speed multiplied by a constant (K) used in the running speed control carried out by the fourth means; and
   (b) eleventh means for determining whether the sum calculated by the tenth means becomes equal to zero the zero point of the sum being defined as the transfer point wherein the ninth means transfers the running speed control, when the eleventh means determines that the sum calculated by the tenth means becomes equal to zero.

3. The system according to claim 1, wherein the eighth means comprises:
   (a) tenth means for calculating a sum (Kre·$\alpha + \epsilon$) of the speed difference ($\epsilon$), and the rate of change ($\alpha$) in the running speed used in the running speed control carried out by the fourth means multiplied by a predetermined number (Kres) which is smaller than a constant (K) used in the running speed control carried out by the fourth means;
   (b) eleventh means for determining whether the sum calculated by the tenth means becomes equal to zero, wherein the seventh means comprises a twelfth means for generating and outputting a third signal to the first means in response to the reset command from the sixth means so that the running speed is controlled to return to the set cruising speed using the sum (Kre·α+ε) calculated by the tenth means, when the eleventh means determines that the sum calculated by the tenth means becomes equal to zero.

4. The system according to claim 3, wherein the ninth means transfers automatic cruise control from control by the twelfth means to control by the fourth means when a predetermined time has passed.

5. The system according to claim 3, wherein the predetermined number (Kres) is varied in increments of another predetermined number (m) and wherein the ninth means transfers automatic cruise control from control by the twelfth means to that by the second means when the varied predetermined number (Kres) becomes equal to the constant (K).

6. The system according to claim 5, wherein the predetermined number (Kres) is incremented by the other predetermined number (m) whenever a predetermined time has passed.

7. A system for controlling a vehicle speed to a desired cruise speed, comprising:
   (a) first means for actuating a throttle valve of a vehicle's engine to displace an angular position of the throttle valve so as to adjust the vehicle speed in response to a signal inputted thereto;
   (b) second means for detecting a current vehicle speed;
   (c) a set switch for operatively generating a cruising speed command signal;
   (d) third means for storing the vehicle speed detected by the second means in response to the cruising speed command signal from the set switch;
   (e) fourth means for generating and outputting a control signal, in accordance with a first constant, to the first means to control the vehicle speed so that the vehicle runs at the stored vehicle speed;
   (f) fifth means for operatively releasing the vehicle speed control by the fourth means;
   (g) a reset switch for operatively generating and outputting a return command signal after the vehicle speed control by the fourth means is released by the fifth means;
   (h) sixth means for calculating a sum of a speed difference between the stored vehicle speed and the current vehicle speed, and an acceleration value during the return of the vehicle to the stored vehicle speed multiplied by a second constant, and for determining whether the sum is positive or negative in response to the return command signal from the reset switch; and
   (i) seventh means for transferring the vehicle speed control to the fourth means when the sixth means determines that the calculated sum is positive.

8. The system according to claim 7, wherein the second constant is made equal to the first constant at a predetermined time after the reset switch outputs the return command signal to the sixth means.

9. The system according to claim 7, wherein the second constant by which the acceleration value is multiplied is the first constant used for the vehicle speed control by the fourth means.

10. The system according to claim 7, wherein the second constant by which the acceleration value is multiplied is varied with respect to time until it coincides with the first constant used for the vehicle speed control by the fourth means.

11. The system according to claim 7, wherein the system switches the vehicle speed control to control by the fourth means when the sixth means determines that the calculated sum is negative.

12. A method for controlling a vehicle speed, comprising the steps of:
   (a) generating and outputting a set command to set the vehicle speed to a cruising speed;
   (b) detecting the actual vehicle speed;
   (c) generating and outputting a first control signal to a first means for adjusting the vehicle speed according to an angular position of the first means in response to the set command signal outputted in the step (a) so that the actual vehicle speed detected in the step (b) is controlled so as to coincide with the set cruising speed;
   (d) detecting a state in which the vehicle speed is forcibly reduced and the control of vehicle speed carried out in the step (c) is interrupted;
   (e) generating and outputting a reset command to return the actual vehicle speed to the set cruising speed after the detection in the step (d);
   (f) generating and outputting a second signal to the first means in response to the reset command outputted in the step (e) so that the actual vehicle speed is controlled so as to return to the set cruising speed;
   (h) determining a transfer point at which the vehicle speed control is transferred to that carried out in the step (c), on the basis of a speed difference between the actual vehicle speed detected in the step (b) and the set cruising speed set in the step (a), and a value corresponding to a rate of change in the actual vehicle speed; and
   (i) transferring the vehicle speed control from that carried out in the step (e) to that carried out in the step (c) when the transfer point determined in the step (h) is reached.

13. A system for a vehicle, comprising:
   (a) a vehicle speed sensor for detecting an actual vehicle speed;
   (b) a set switch through which a command signal to command a cruise speed control is produced when the set switch is once turned on and then turned off;
   (c) vehicle speed storage means for storing the actual vehicle speed detected by the vehicle speed sensor in response to the command signal produced from the set switch;
   (d) actuating means for actuating an engine driving force adjusting mechanism to adjust an operating variable of the engine driving force adjusting mechanism, thus changing the vehicle speed;
   (e) cruise speed controlling means responsive to the command signal produced from the set switch for outputting a control command signal to the actuating means to command the cruise speed control to the actuating means so that the actual vehicle speed becomes equal to the stored vehicle speed;
   (f) a resume switch through which another command signal to command a return of the vehicle speed to the stored vehicle speed is produced when the resume switch is operated, the other command signal being effective after the operation of the system by the cruise speed controlling means is released and the actual vehicle speed is reduced;
   (g) constant acceleration controlling means rsponsive to the other command signal produced from the resume switch for producing another control command signal to the actuating means to command a constant acceleration control to the actuating means so that the vehicle speed is increased toward the stored vehicle speed stored in the vehicle speed storage means;

(h) determining means responsive to the other command produced from the resume switch for determining whether the actual vehicle speed reaches a point at which the control of the vehicle speed is transferred from the constant acceleration control by the constant acceleration controlling means to the cruise speed control by the cruise speed controlling means so that the vehicle speed is smoothly returned to the stored vehicle speed without overshooting; and (i) switching means responsive to the determination by the determining means that the actual vehicle speed reaches the point for switching the vehicle speed control from the constant acceleration control to the cruise speed control.

14. A system as set forth in claim 13, wherein the point is defined as a point where a sum of the constant acceleration derived from the constant acceleration controlling means and multiplied by a constant and a speed difference between the actual vehicle speed and the stored vehicle speed becomes zero.

15. A system as set forth in claim 14, wherein the cruise speed controlling means executes the cruise speed control via the actuating means using the control command signal on the basis of the following control equation: $K \cdot alpha + epsilon$, wherein alpha denotes a change in the rate of the vehicle speed used in the cruise speed control, K denotes a constant used in the cruise speed control, and epsilon denotes a speed difference between the actual vehicle speed and the stored vehicle speed and wherein the cruise speed controlling means controls the vehicle speed so as to make the equation of $(K \cdot alpha + epsilon)$ zero.

16. A system as set forth in claim 15, wherein the constant used to determine whether the actual vehicle speed reaches the point is made equal to the constant K used in the cruise speed control after the actual vehicle speed reaches the point and then a predetermined period of time has passed.

17. A system as set forth in claim 15, wherein the constant used in the constant acceleration controlling means is changed until it coincides with the constant K used in the cruise speed controlling means.

* * * * *